Nov. 8, 1938.  A. B. STEELE  2,136,061
DOOR OPENING AND CLOSING MECHANISM
Filed Aug. 4, 1936
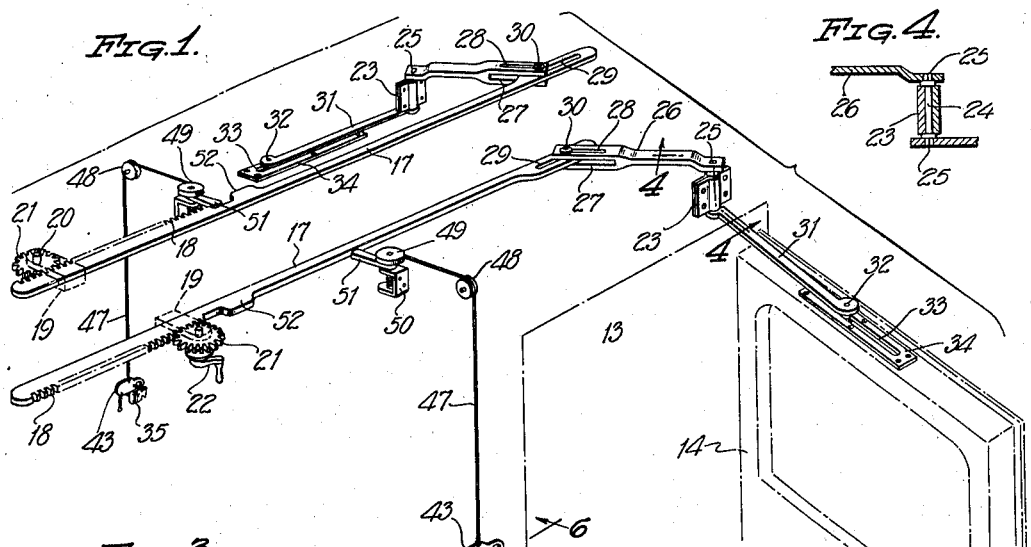
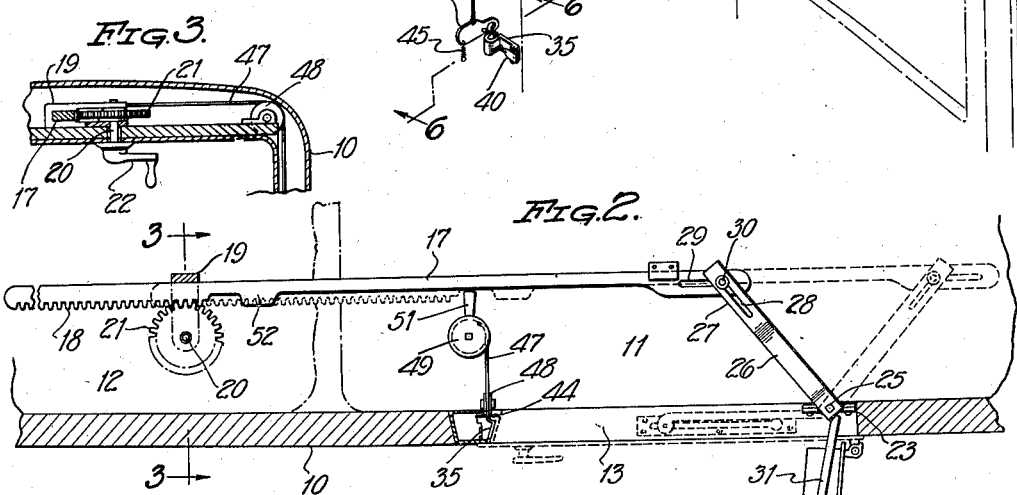
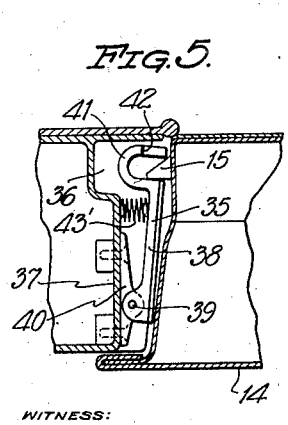
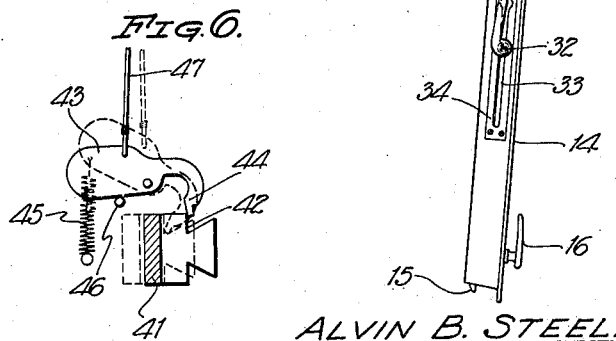
ALVIN B. STEELE,
INVENTOR.
BY Ely & Pattison
ATTORNEYS.

Patented Nov. 8, 1938

2,136,061

UNITED STATES PATENT OFFICE 2,136,061

DOOR OPENING AND CLOSING MECHANISM

Alvin B. Steele, New York, N. Y.

Application August 4, 1936, Serial No. 94,158

2 Claims. (Cl. 292—340)

This invention relates to automobile door opening and closing mechanism, and is an improvement over the construction set forth in my prior U. S. Letters Patent No. 1,969,767, granted August 14, 1934.

This invention aims to provide a door operating mechanism by which a chauffeur or taxi driver of a motor vehicle may selectively control the opening and closing of the rear side doors thereof without leaving the front driver's seat or necessitating reaching rearwardly out of the vehicle to perform such operation.

Another feature of the invention is to provide a door operating mechanism which may be completely arranged within the top and sides of the body of a motor vehicle for concealment so as not to alter or detract from the appearance of the motor vehicle.

A further feature of the invention resides in a door operating mechanism which is simple and inexpensive of construction, easy of actuation, and which consists of a relatively few parts which are not likely to become out of working order.

With these and other objects in view, the invention resides in the certain novel construction, combination and arrangement of parts, the essential features of which are hereinafter fully described in the following specification, are particularly pointed out in the appended claims, and are illustrated in the accompanying drawing, in which:

Figure 1 is a perspective view of a pair of door operating mechanisms for controlling the opening and closing of the right and left side doors of an automobile, the left door operating mechanism being shown in door opening position, and the right door operating mechanism being shown in door closing position.

Figure 2 is a fragmentary horizontal sectional view through the left side of the body of an automobile, with the left door actuating mechanism illustrated in door opening position in full lines, and in door closing position in dotted lines.

Figure 3 is a detail vertical sectional view on the line 3—3 of Figure 2.

Figure 4 is a detail vertical sectional view on the line 4—4 of Figure 1.

Figure 5 is a horizontal sectional view through the door latching mechanism.

Figure 6 is a detail vertical sectional view on the line 6—6 of Figure 1, the dotted lines indicating the position of the parts when the keeper member is in retracted position.

Referring to the drawing by reference characters, the numeral 10 designates a portion of the body of a motor vehicle which includes a rear passenger compartment 11, and a forward driver's compartment 12, within which the driver's seat of the automobile is arranged. Provided in the side walls of the body 10 for ingress to and egress from the passenger compartment 11 are door openings of which only the left door opening 13 is shown in the drawing, although it is understood that a similar opening is provided at the right side of the body.

A swinging door 14 is provided for closing the door opening 13 and the said door is provided with the usual latch bolt 15 which is manually operable from the outside of the door by an actuating handle 16.

In Figure 1 of the drawing, I have illustrated a pair of identical door actuating mechanisms, one for the right door and the other for the left door, but in view of the fact that both mechanisms are alike, a description of the left door mechanism will suffice for the other.

Mounted within the top of the motor vehicle body 11 for movement in a fore and aft direction, is a slide bar 17, the forward end of the said bar being provided with a series of rack teeth 18. The forward end of the bar 17 extends to a position above the driver's seat, although the said bar and the other operating parts are concealed in the space between the inner and outer walls of the motor vehicle body so as to be concealed from view. Mounted in the top of the body directly above the driver's seat within the driver's compartment 12 is a bracket 19 in which a vertically disposed shaft 20 is journaled. Carried by the shaft 20 and having meshing engagement with the rack teeth 18 is a gear wheel 21, the lower end of the shaft 20 has a crank handle 22 fixedly secured thereto, and which is disposed directly below the ceiling of the driver's compartment within reach of the operator of the motor vehicle. It will thus be seen by rotating the gear 21 by actuation of the crank handle 22, the bar 17 may be made to slide either forwardly or rearwardly.

Fixed to the body 11 directly above the door opening 13 and adjacent the hinged side of the door 14 is a bracket 23 within which a vertically disposed pin 24 is journaled, the opposite ends of the said pin projecting above and below the bracket and terminating in squared portions 25. Fixed to the squared portion 25 at the top of the pin 24, is one end of a lever 26, the opposite end of the said lever 26 being forked as at 27 and the arms of the fork being provided with elongated slots 28. The forked end 27 slidably receives the rear end of the bar 17, the said end of the bar being provided with an elongated slot 29 while passing through the slot 29 and the slots 28 is a pin 30. This pin and slot connection permits the bar 17 to slide longitudinally and to effect actuation of the lever 26 which swings on an arc and performs a further function to be explained hereinafter.

Fixed to the squared portion 25 at the lower end of the pin 24 is one end of an arm 31, the other end of the said arm being provided with a pin 32 which operates in a slot 33 provided in a plate 34 secured to the top of the door 14.

Operation of the parts so far described are as follows: Assume that the door and its actuating mechanism is in closed position as indicated by the position of the parts of the mechanism for operating the right hand door illustrated in Figure 1. The operator imparts rotation to the gear 21 by the actuation of the crank handle 22, the turning movement of the gear being in such direction as to cause the bar 17 to move forwardly. The forward movement of the bar exerts a pull on the lever 26, which pull rotates the pin 24 and swings the arm 31 outwardly, thus moving the door 14 in a similar direction. When it is desired to close the door, the crank handle 22 is turned in a reverse direction to impart a rearward sliding movement to the bar 17, which movement reverses the turning movement of the lever 26, pin 24, and arm 31 to cause the door 14 to swing inwardly to closed position.

For the purpose of securing the door 14 in closed position, there is provided a keeper member 35, which is mounted in a recess 36 provided in the door jamb 37 at a point opposite to the latch bolt 15 when the door 14 is in closed position. The keeper member 35 includes a flat elongated arm 38 which is pivoted at one end as at 39 to a bracket 40, which bracket is secured to the jamb 37. The other or inner end of the arm 38 is provided with a hook shaped keeper element 41, and the bill of the hook shaped keeper member is provided with a dovetailed portion to provide shoulders 42, only one of which is necessary for the operation of the release of the keeper member but two have been shown in order that the keeper members may be used on right and left jambs. The hook shaped keeper portion 41 is so positioned that it receives the latch bolt 15 when the door 14 is in closed position. A spring 43' acts upon the keeper member 35 to normally hold the same in an extended position for locking engagement with the latch bolt 15.

In view of the fact that it is necessary to release the keeper member 35 from engagement with the latch bolt 15 prior to the movement of the door 14 from a closed to an open position, I provide a mechanism which is operable by the bar 17 prior to any movement of the door 14 to an open position. For such purpose, a pivoted catch member 43 is mounted within the recess 36 directly above the keeper member 35 and the said catch member 43 is provided with a hook shaped portion 44 which is engageable with the shoulder 42 on the keeper member 35. A spring 45 tends to normally move the pivoted catch member 43 to releasing position and which movement is limited by a stop pin 46. When in releasing position as shown in full lines in Figure 6, the keeper member 35 is in extended position for locking engagement with the latch bolt 15. Secured to the catch member 43 is one end of a pull cable 47, the said cable rising upwardly within the door jamb and passing over a pulley 48 mounted adjacent the top of the body. The upper end of the cable 47 is fixedly secured to a grooved wheel 49, which wheel is mounted on a bracket 50. Fixed to the wheel 49 and extending inwardly toward the slide bar 17, is an arm 51. The arm 51 is disposed in the path of a cam 52 provided on the bar 17 and the cam is so positioned that upon the initial forward movement of the bar 17, the arm 51 will be struck by the cam 52 and as the cam moves forward, the arm 51 will be turned, thus imparting a turning movement to the wheel 49 and causing a winding of the cable 47 on the grooved wheel, which winding exerts an upward pull upon the catch member 43. As the catch member 43 moves upwardly against the tension of the spring 45, the bill 44 of the hook shaped portion of the catch member presses the hooked end of the keeper member 35 inwardly and out of the path of the latch bolt 15. Thus the door 14 is now free to be swung to an open position upon the further movement of the bar 17 in a forward direction. The pin and slot connection between the rear end of the bar 17 and the lever 26 permits of the actuation of the keeper member 35 to a released position prior to any movement of the lever 26 which operates to swing the door outwardly. After the cam 52 has cleared the arm 51, the spring 45 will return the catch member 43 to normal position, thus allowing the keeper member 35 to return to its normal extended position. During a door closing operation, the cam 52 again strikes the arm 51 but it is not necessary that a pull be exerted upon the cable 47 for the reason that the latch bolt 15 will ride up the inclined side face of the arm 38 of the keeper member 35 to a position in locking engagement with the hook portion 41 and as clearly shown in Figure 5 of the drawing.

While I have shown and described what I consider to be the most practical embodiment of my invention, I wish it to be understood that such changes and alterations as come within the scope of the appended claims may be resorted to if desired.

Having thus described the invention, what I claim as new and desire to secure by Letters Patent of the United States, is:—

1. An automobile door latch device comprising in combination, a keeper member pivoted at one of its ends and adapted to be mounted in the jamb of a door opening, a hook shaped keeper element provided on the free end of said keeper member, spring means acting upon said keeper member to normally extend the hook shaped keeper element in extended position, actuating means for moving said keeper member to a retracted position, said actuating means including a pivoted spring pressed actuating member disposed above said keeper member and in pressing engagement with the bill of said hook shaped keeper element, the pivotal axis of the catch member being at right angles to the pivotal axis of the keeper member and a cable connected with said actuating member for actuating the same against its spring tension to cause the actuating member to forcibly press against the bill of said hook shaped keeper element to move the latter to a retracted position.

2. An automobile door latch device comprising in combination, a keeper member including a flat shank over which a door latch bolt is adapted to pass during the closing of a door, said flat shank being pivoted at one end and adapted to be mounted in a door jamb, a hook shaped keeper element on the free end of said shank, spring means acting upon said keeper member to normally hold said hook shaped keeper element extended to receive therein a door latch bolt upon closing of a door, a pivoted actuating member disposed above said keeper member and engaging the bill portion of said hook shaped keeper element, the pivotal axis of the catch member being at right angles to the pivotal axis of the shank of the keeper member, spring means tending to normally urge said actuating member away from the bill portion of said hook shaped keeper element, and manual actuating means connected with said actuating member for turning the same against the action of its associated spring means to cause the actuating member to forcibly engage the bill portion of the hook shaped keeper element to move the keeper member to a retracted position against the action of both spring means.

ALVIN B. STEELE.